United States Patent [19]

Nagata

[11] Patent Number: 5,574,528
[45] Date of Patent: Nov. 12, 1996

[54] CAMERA HAVING INSIDE-ILLUMINATING LIGHT SOURCE

[75] Inventor: Kazuaki Nagata, Omiya, Japan

[73] Assignee: Fuji Photo Optical Co., Ltd., Saitama, Japan

[21] Appl. No.: 409,008

[22] Filed: Mar. 23, 1995

[30] Foreign Application Priority Data

Apr. 9, 1994 [JP] Japan .................................. 6-095574

[51] Int. Cl.⁶ ..................................................... G03B 17/02
[52] U.S. Cl. .............................................. 396/536; 396/538
[58] Field of Search ............................. 354/64, 105, 106, 354/202, 284, 288

[56] References Cited

U.S. PATENT DOCUMENTS

| | | | |
|---|---|---|---|
| 4,104,658 | 8/1978 | Uchiyama et al. | 354/106 |
| 4,688,916 | 8/1987 | Dobashi et al. | 354/288 |
| 4,973,997 | 11/1990 | Harvey | 356/106 |
| 5,376,484 | 12/1994 | Iwagaki | 354/106 X |

*Primary Examiner*—D. Rutledge
*Attorney, Agent, or Firm*—Townsend & Banta

[57] ABSTRACT

The present invention relates to a camera which is capable of easily performing the film replacement even if it is in a dark place. This camera is equipped with an illuminating lamp in a patrone compartment within the camera or at the vicinity of the patrone compartment so as to lighten at least the patrone compartment with the lamp. In addition, this lamp turns on in response to a detection of a rear cover being opened, and turns off in response to a detection of the rear cover being closed. Moreover, a detector to detect an outside brightness is provided such that the lamp can be turned on when it has detected that the outside brightness is below a predetermined brightness. Thus, it is possible to offer a convenient camera.

4 Claims, 2 Drawing Sheets

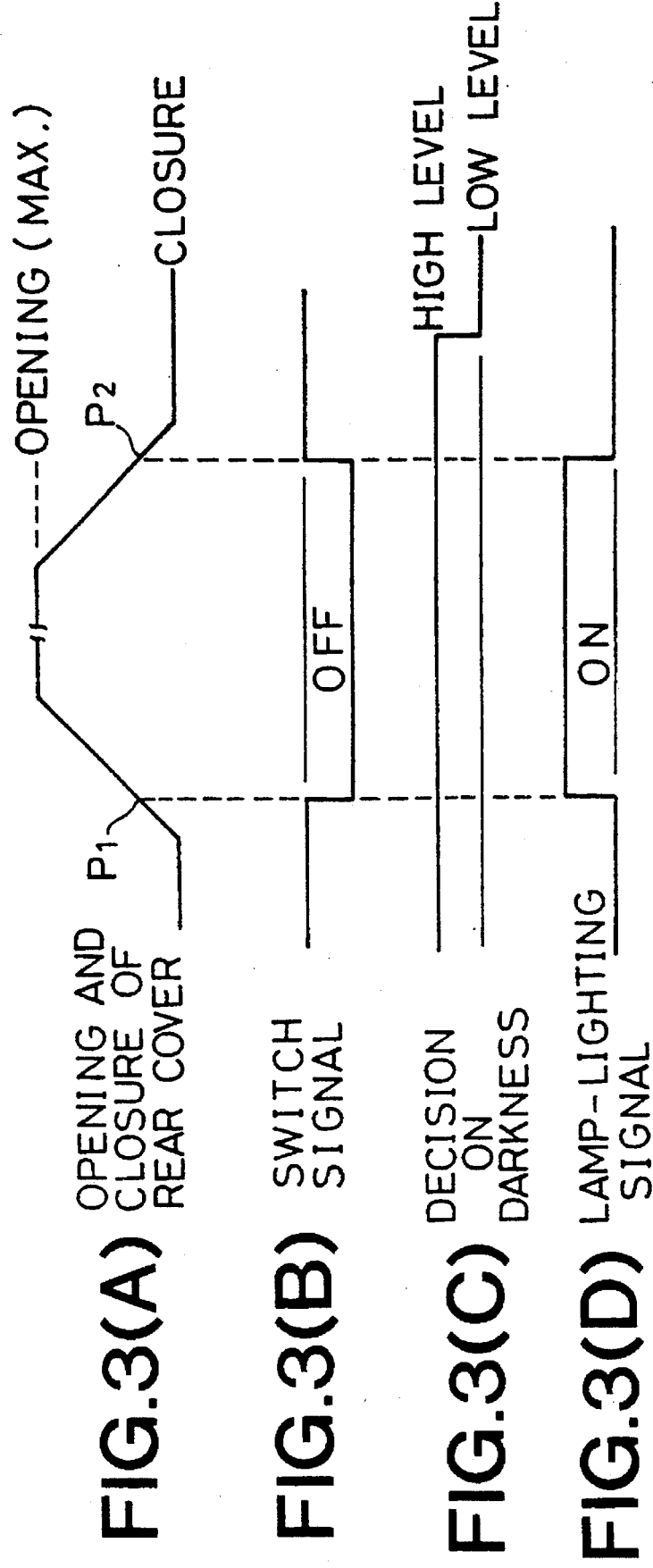

CAMERA HAVING INSIDE-ILLUMINATING LIGHT SOURCE

BACKGROUND OF THE INVENTION

This application claims the priority of Japanese Patent Application No. 6-95574 filed on Apr. 9th, 1994.

FIELD OF THE INVENTION

This invention relates to an arrangement of a camera in which an inside-illuminating light source is lighted when opening a rear cover to replace a film with a new one.

DESCRIPTION OF THE RELATED ART

In general, the rear cover of a camera is opened for replacement of a film, in other words, taking-out and mounting of the film. For example, when mounting a film, with the rear cover being released, a film patrone is inserted into a patrone compartment and an end of the film is set in the specified state. Then, after closing the rear cover, time film can be taken up manually or automatically to set the film to the photography-starting position.

However, with conventional cameras there is difficulty in replacing film in the dark. For this reason, for film replacement in darkness it is necessary to search for a bright place and move thereto or light places near hands with an illuminating lamp, which is inconvenient.

SUMMARY OF THE INVENTION

This invention has been developed with a view to the above-mentioned problem, and it is an object of this invention to provide a camera capable of easily performing the film replacement even in dark places by equipping the camera with a convenient inside-illuminating light source.

In order to achieve the above-mentioned object, a camera according to this invention features an illuminating light source provided within the camera so as to lighten at least the patrone compartment. In addition, its feature includes a control circuit to on-off-control the illuminating light source in response to the opening and closing of a rear cover. Moreover, a first detector is provided which senses the external brightness, whereby the control circuit can light the illuminating light source in response to a decision being made on the basis of the output of the first detector such that the brightness is below a predetermined value.

According to the above arrangement, for example, with an illuminating light source being mounted in the patrone compartment, control can be made such that it is turned on when a detecting means detects a second opening of the rear cover and turns off when detecting the closure thereof. This second detecting means for detecting the opening and closing of the rear cover is compatible with conventional rear-cover opening and closing detecting means for automatic film feeding or it is also appropriate to provide a new detecting mechanism. Here, this illuminating light source can also be located outside but near the patrone compartment.

Furthermore, by using light-receiving means used for exposure control in cameras to detect that the outside (external world) is in a dark state, the lighting control of the light source can be made on the basis of both the dark-state detection and above-mentioned rear cover opening and closing detection. Thus, the lighting operation of the light source can be limited only to when required, thereby allowing effective control.

BRIEF DESCRIPTION OF THE DRAWINGS

FIG. 3 shows a waveform chart illustrating the operations of the embodiment.

DESCRIPTION OF THE PREFERRED EMBODIMENT

Figure 1:
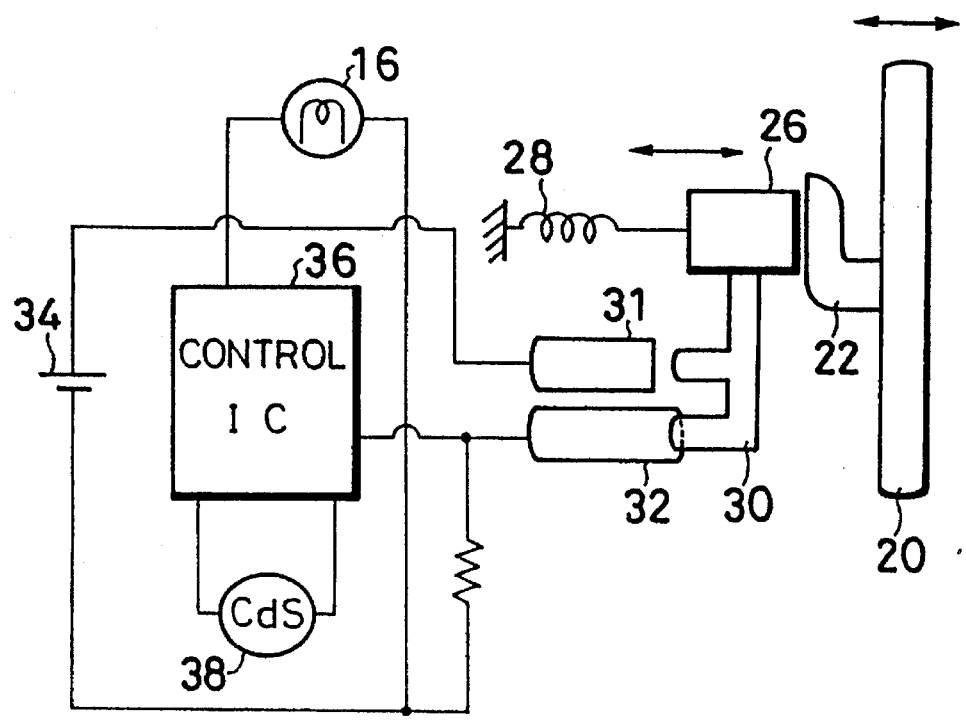
FIG. 1 is a view showing an arrangement of a camera with an inside-illuminating light source according to an embodiment of the present invention.
Figure 2:
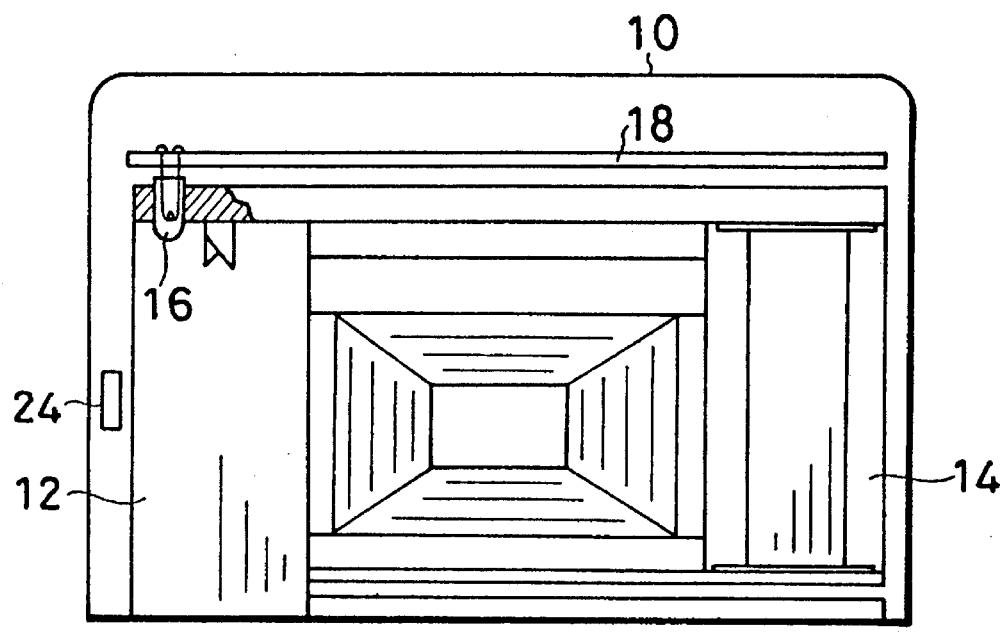
FIG. 2 is a view illustrating, without a cover, the rear side of the camera according to the embodiment.

In FIG. 1 there is shown an arrangement of a camera equipped with an inside-illuminating light source according to an embodiment, and in FIG. 2 there is shown an arrangement inside the camera. In FIG. 2, a body 10 is provided with a patrone compartment 12 for mounting a film patrone and a take-up compartment 14 for winding a film, while a small lamp (illuminating light source) 16 is installed on the upper part of the patrone compartment 12. This lamp 16 is connected to a printed circuit board 18 placed on the top of the body 10.

In FIG. 1, on a rear cover 20 of the body 10 there is mounted a locking claw 22, which is engaged with a locking member of an accepting portion 24 as illustrated in FIG. 2 so as to lock the rear cover 20. Moreover, a switch driver 26 as illustrated in FIG. 1 is positioned in the vicinity of this accepting portion 24 to be pushed by the locking claw 22. This switch driver 26 is urged by a spring 28 toward the rear cover 20. On this switch driver 26 there is mounted a contact piece 30 having two contact points, positive and negative electrode pieces 31 and 32 being located so as to come into contact with this contact piece 30.

FIG. 1 shows a state when the rear cover 20 is slightly opened, and in this state the contact point of the contact piece 30 is brought into contact with the negative electrode piece 32 but not brought into contact with the positive electrode piece 31. On the other hand, when closing the rear cover 20, both the contact points of the contact piece 30 will come into contact with both the electrode pieces 31 and 32. Thus, the open or closed state of the rear cover 20 is detectable on the basis of the contact states of the contact piece 30 with both the electrode pieces 31 and 32. In addition, both the electrode pieces 31, 32 are arranged to have specified lengths so that the detection timings are different from each other, thus detecting the closed state of the rear cover 20 before the rear cover 20 is closed completely. This allows visual confirmation of the turned-off state of the lamp 16 as will be described hereinafter.

To the electrode pieces 31 and 32 there is connected a battery 34 and further, through wiring illustrated, there are coupled the above-mentioned lamp 16 and a control IC 36. This control IC 36 is fitted into the printed circuit board 18. Accordingly, when the contact piece 30 comes into contact with the electrode pieces 31 and 32, a given voltage from the battery 34 is applied to the control IC 36 which permits the detection of the open or closed state of the rear cover 20. Furthermore, to this control IC 36 there is connected a light-receiving element 38 composed of a CdS which is also used for exposure control. In this embodiment the detection signal of the light-receiving element 38 is always monitored by the control IC 36, whereby a decision can be made as to whether the outside is below a predetermined brightness or not, that is, whether the outside is dark or not. Furthermore, when detecting that the rear cover 20 is open and that the outside is dark, the control IC 36 performs a control so that the power of the battery 34 is supplied to the lamp 16.

This embodiment takes above-described arrangement whose action will be explained below with reference to FIG. 3. FIG. 3(A) illustrates the opening and closing operations of the above-mentioned rear cover 20. In response to the locking claw 22 in FIG. 1 being released, the rear cover 20 can be opened gradually to the maximum extent, and on the other hand, when being pushed, the rear cover 20 is closed gradually. Pressed by the locking claw 22 in linking relation to the opening and closing of the rear cover 20, the switch driver 26 will be moved right and left in FIG. 1. Furthermore, when the rear cover 20 is opened, one of the contact points of the contact piece 30 of the switch driver 26 is released from the positive electrode piece 31 at a position P1 in FIG. 3(A) so that a switch signal becomes in an OFF state as illustrated in FIG. 3(B). On the other hand, assuming that the user is in a dark place, a decision is made, on the basis of the detection signal from the light-receiving element 38, so that the brightness is below a predetermined value, thus outputting a high-level signal as illustrated in FIG. 3(C).

Following this, on the basis of the switched-off signal in FIG. 3(B) and the high-level signal in FIG. 3(C), the control IC 36 outputs an on-state lamp-lighting signal as shown in FIG. 3(D), thereby lighting the lamp 16. The lamp 16 illuminates the inside of the patrone compartment 16 and the places around it, and even if in a dark place, the user can easily perform a film replacement (taking-out or mounting) of films.

On the other hand, when the rear cover 20 is closed after the film replacement, both the contact points of the contact piece 30 of the switch driver 26 come into contact with both the electrode pieces 31, 32 at a position P2 in FIG. 3(A), whereby the switch signal becomes in the ON state as illustrated in FIG. 3(B). For this reason the control IC 36, even though the outside is dark, turns off the lighting signal on the basis of the switch-on signal as shown in FIG. 3(D), thereby putting out the lamp 16. In this case, since the lamp 16 is arranged to turn off at the position P2 before the complete closure of the rear cover 20 as described above, the user can confirm the turning-off of the lamp 16.

Here, in cases where the decision for the outside to be light is being made on the basis of the detection of the light-receiving element 38, the signal in FIG. 3(C) goes into a low level, and hence, regardless of opening the rear cover 20, the lamp 16 remains turned off.

Although in the above-described embodiment the lamp 16 is provided on the upper part of the patrone compartment 12, as long as at least the patrone compartment 12 can be confirmed, the lamp 16 is allowed to be located at a different position within the body 10.

Moreover, although in this embodiment the switch driver 26, being pushed by the locking claw 22, is used as means for detecting the opening or closed state of the rear cover 20, if a mechanism to detect the closed state of the rear cover 20 is equipped in the camera in order to automatically feed a film, it is possible to utilize this detection mechanism. Furthermore, it is also possible to locate this opening and closure detecting means at a hinge side of the rear cover or the like.

As described above, according to this invention, even if being in a dark place, the user can easily perform the film replacement without relying on illuminating devices used generally. Thus, there is an advantage of offering a convenient camera. In addition, if the above-described illuminating light source is turned on by the brightness detecting means only when it is dark, it is possible to perform the light source lighting control with high efficiency and hence to remove the waste in lighting.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A camera having an inside-illuminating light source, said camera comprising:

an illuminating light source provided within said camera for lighting at least a patrone compartment within said camera; and a control circuit for controlling lighting of said illuminating light source in accordance with opening and closing of a rear cover.

2. The camera having an inside-illuminating light source as claimed in claim 1, further comprising a first detector for detecting an outside brightness, wherein said control circuit lights said illuminating light source when deciding, on the basis of an output of said first detector, that said outside brightness is below a predetermined brightness.

3. The camera having an inside-illuminating light source as in claim 2, wherein said first detector for outside brightness is made up of a light-receiving element to be used for exposure control.

4. A camera having an inside-illuminating light source, said camera comprising:

an illuminating light source comprising a lamp provided within said camera for lighting at least a patrone compartment within said camera;

a second detector for detecting open and closed states of a rear cover;

a first detector for detecting an outside brightness; and a control circuit for turning on said lamp when said first detector has decided that said outside brightness is below a predetermined brightness and said first detector has decided that said rear cover has been opened, and turning off said lamp when said second detector has decided that said rear cover has been closed.

\* \* \* \* \*